United States Patent
Yamazaki et al.

(10) Patent No.: US 6,336,445 B1
(45) Date of Patent: Jan. 8, 2002

(54) FUEL SUPPLYING APPARATUS AND METHOD FOR INTERNAL COMBUSTION ENGINE

(75) Inventors: Daichi Yamazaki, Toyota; Naoki Kurata, Nishikamo-gun; Masanori Sugiyama, Aichi-gun, all of (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/632,786

(22) Filed: Aug. 4, 2000

(30) Foreign Application Priority Data

Sep. 9, 1999 (JP) ............................. 11-256164

(51) Int. Cl.⁷ ............................................. F02M 37/04
(52) U.S. Cl. ...................... 123/506; 123/456
(58) Field of Search .................. 123/506, 500, 123/501, 458, 456, 446, 502

(56) References Cited

U.S. PATENT DOCUMENTS

| | | | | |
|---|---|---|---|---|
| 4,790,277 A | * | 12/1988 | Schechter | 123/357 |
| 5,012,786 A | * | 5/1991 | Voss | 123/467 |
| 5,345,916 A | * | 9/1994 | Amann et al. | 123/506 |
| 5,697,347 A | * | 12/1997 | Enomoto et al. | 123/502 |
| 5,727,525 A | * | 3/1998 | Tsuzuki | 123/447 |
| 6,237,573 B1 | * | 5/2001 | Onishi et al. | 123/506 |
| 6,257,204 B1 | * | 7/2001 | Kamijo et al. | 123/456 |

FOREIGN PATENT DOCUMENTS

| | | |
|---|---|---|
| JP | 10-176618 | 12/1996 |
| JP | 10-176619 | 6/1998 |

* cited by examiner

Primary Examiner—Carl S. Miller
(74) Attorney, Agent, or Firm—Oliff & Berridge, PLC

(57) ABSTRACT

In a high-pressure fuel pump of a fuel supplying apparatus, the amount of movement of a plunger (cam speed) occurring during a unit-angle rotation of a cam changes in accordance with the phase of the cam. The amount of fuel delivered from the high-pressure fuel pump is controlled by changing the start timing of closure of an electromagnetic spill valve. However, the amount of fuel delivered is greatly affected by the cam speed at the start of closure of the spill valve. Therefore, for example, a cam profile of the cam is set such that the closure start timing of the electromagnetic spill valve that provides a maximum amount of fuel that needs to be delivered for fuel injection is placed within a predetermined cam angle range in which the change in the cam speed with respect to changes in phase of the cam is constant. Therefore, the changing of the closure start timing of the electromagnetic spill valve for the purpose of adjusting the amount of fuel delivered is performed within the predetermined cam angle range.

15 Claims, 9 Drawing Sheets

CAM PHASE

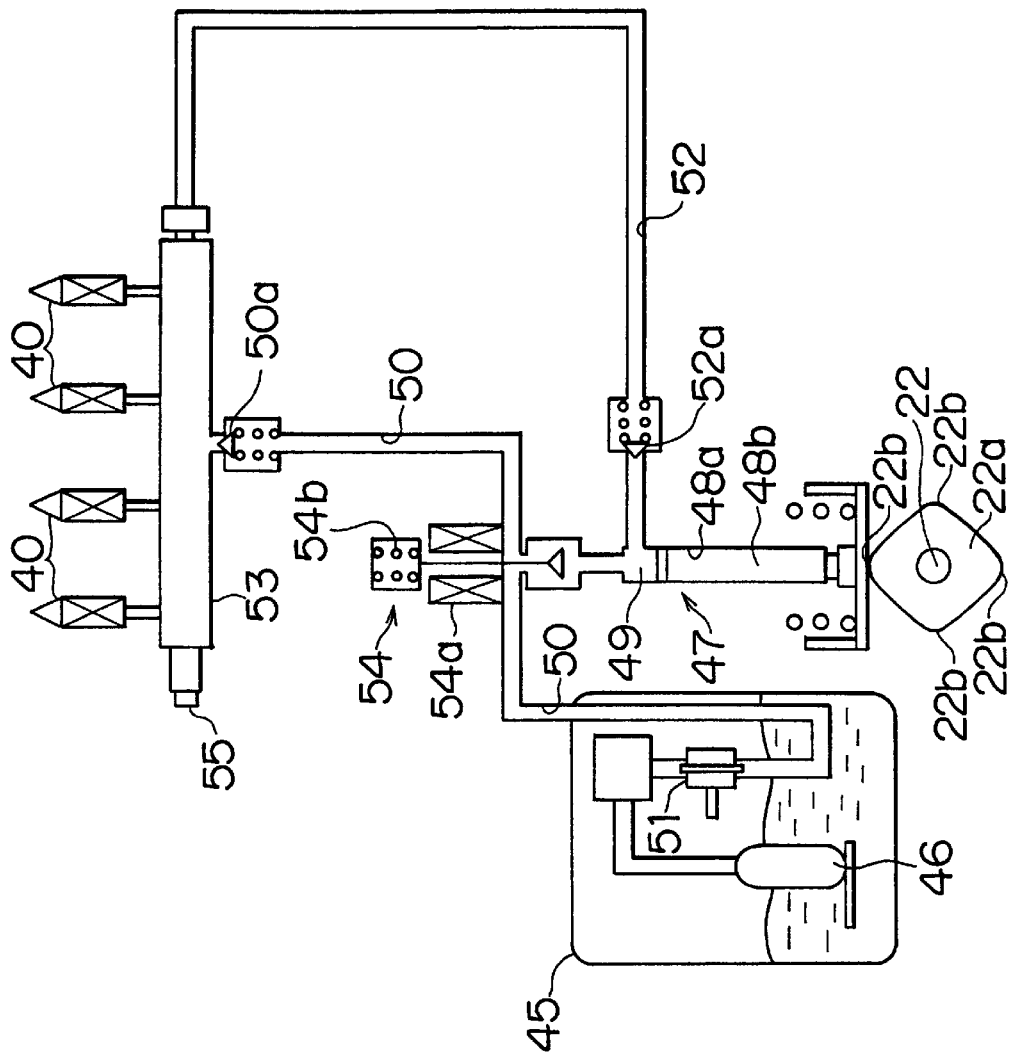

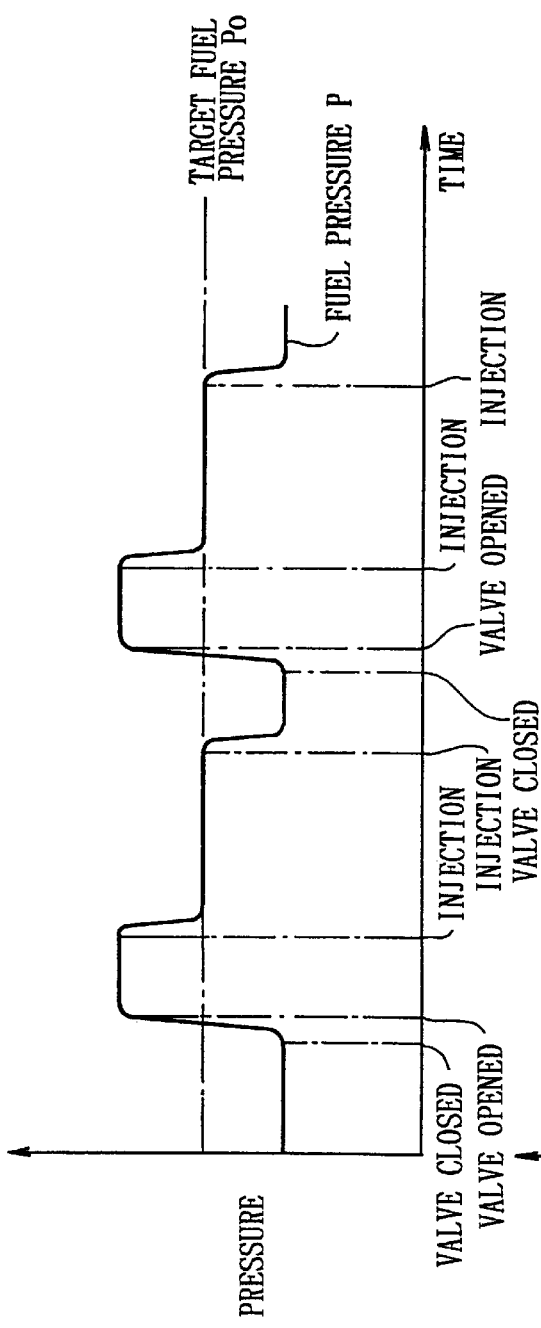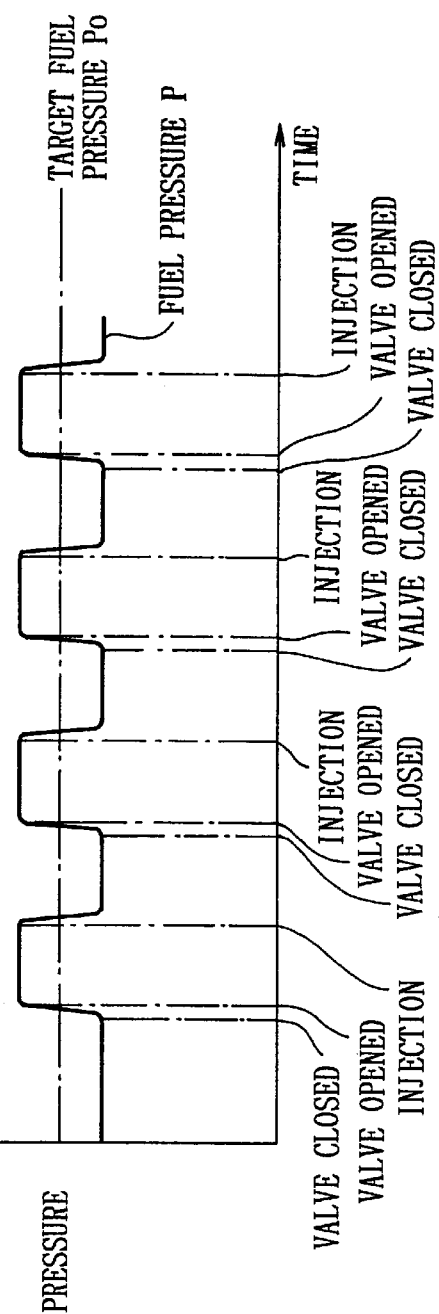
FIG. 8A
FIG. 8B

FUEL SUPPLYING APPARATUS AND METHOD FOR INTERNAL COMBUSTION ENGINE

INCORPORATION BY REFERENCE

The disclosure of Japanese Patent Application No. 11-256164 filed on Sep. 9, 1999 including the specification, drawings and abstract is incorporated herein by reference in its entirety.

BACKGROUND OF THE INVENTION

1. Field of the Invention

The invention relates to a fuel supplying apparatus and method for an internal combustion engine.

2. Description of the Related Art

In internal combustion engines, automotive engines and the like, an engine that directly injects fuel into a combustion chamber for the purpose of improving fuel economy and the like has recently been commercialized. As such, a high pressure of fuel supplied to the fuel injection valve is required in order to inject fuel from the fuel injection valve into the combustion chamber and thus overcome the high pressure in the combustion chamber. Therefore, fuel fed from a fuel tank by a feed pump is pressurized by a high-pressure fuel pump and delivered to the fuel injection valve. A known fuel supplying apparatus having a high-pressure fuel pump as mentioned above is described in Japanese Patent Application Laid-Open Nos. 10-76618 and 10-176619. A fuel supplying apparatus described in these laid-open patent applications is shown in FIG. 9.

As shown in FIG. 9, a high-pressure fuel pump 101 of the fuel supplying apparatus has a plunger 103 that is reciprocated within a cylinder 102 by rotation of a cam 100, and a pressurizing chamber 104 defined by the cylinder 102 and the plunger 103. Connected to the pressurizing chamber 104 are a suction passage 107 communicating with a feed pump 106 for feeding fuel from a fuel tank 105, a spill passage 108 that lets fuel out of the pressurizing chamber 104 to return fuel to the fuel tank 105, and a delivery passage 110 for delivering pressurized fuel from the pressurizing chamber 104 toward a fuel injection valve 109. The high-pressure fuel pump 101 has a spill valve 111 that opens and closes the communication of the spill passage 108 and the suction passage 107 with the pressurizing chamber 104.

When the plunger 103 is moved in such a direction as to increase the capacity of the pressurizing chamber 104 (downward in the drawing) while the spill valve 111 is in an open state, that is, when the high-pressure fuel pump 101 is in the suction stroke, fuel is drawn from the suction passage 107 into the pressurizing chamber 104. When the spill valve 111 is closed during a movement of the plunger 103 in the pressurizing chamber 104-capacity reducing direction (upward in the drawing), that is, during the fuel ejection stroke of the high-pressure fuel pump 101, the communication of the suction passage 107 and the spill passage 108 with the pressurizing chamber 104 is closed, so that fuel is delivered from the pressurizing chamber 104 toward the fuel injection valve 109 via the delivery passage 110.

In this high-pressure fuel pump 101, fuel is delivered toward the fuel injection valve 109 only during the closed valve period of the spill valve 111 during the ejection stroke of the pump, the amount of fuel delivered is adjusted by adjusting the closed period of the spill valve 111 through control of the valve closure start timing of the spill valve 111. That is, the amount of fuel delivered is increased by increasing the closed valve period of the spill valve 111, and is reduced by reducing the closed valve period. When the amount of fuel delivered is adjusted, the pressure of fuel delivered to the fuel injection valve 109 (fuel pressure) is controlled to a target value that is determined in accordance with the operation state of the engine, so that the amount of fuel injected from the fuel injection valve 109, which is determined by the fuel pressure and the fuel injection duration, becomes equal to a proper amount.

Thus, since fuel fed from the feed pump 106 is pressurized by the high-pressure fuel pump 101 and the pressurized fuel is delivered toward the fuel injection valve 109, the engine is able to precisely perform fuel injection.

The amount of fuel delivered from the high-pressure fuel pump 101 is affected by the cam speed (i.e., the amount of movement of the plunger 103 per unit angle rotation of the cam 100) that occurs when the closure of the spill valve 111 starts. The cam speed at the start of closure of the spill valve 111 does not necessarily change at a constant changing rate (with a constant gradient) with respect to changes of the start timing of closure of the spill valve 111. More specifically, the changing rate (gradient) of the cam speed at the start of closure of the spill valve 111 with respect to changes in the start timing of closure of the spill valve 111 greatly fluctuates based on the phase of the cam. If the amount of fuel delivered is adjusted by changing the start timing of closure of the spill valve 111 so as to control the fuel pressure to a target value, the change of the valve closure start timing does not readily adjust the amount of fuel delivered (fuel delivery amount) in an adequate fashion, thus resulting in considerable fluctuations in the fuel pressure during the control of the fuel pressure to the target value.

SUMMARY OF THE INVENTION

Accordingly, it is one object of the invention to provide a fuel supplying apparatus for an internal combustion engine that improves the controllability of the amount of fuel delivered, by appropriately adjusting the amount of fuel delivered in accordance with changes of the closure start timing of a spill valve.

A first aspect of the invention provides a fuel supplying apparatus for an internal combustion engine, having a fuel pump that draws fuel into a pressurizing chamber and delivers fuel toward a fuel injection valve of the internal combustion engine by changing a capacity of the pressurizing chamber based on a relative movement between a cylinder and a plunger caused by a rotation of a cam. The apparatus also includes a spill valve that opens and closes a communication between the pressurizing chamber and a spill passage for letting fuel out of the pressurizing chamber, wherein an amount of fuel delivered from the fuel pump toward the fuel injection valve is adjusted by controlling a closed valve period of the spill valve. The fuel supplying apparatus includes a controller that controls the closed valve period of the spill valve by changing a valve closure start timing of the spill valve so that an amount of fuel that needs to be delivered from the fuel pump for fuel injection from the fuel injection valve is provided. The apparatus is configured so that the valve closure start timing of the spill valve that provides a maximum amount of fuel that needs to be delivered occurs within a predetermined cam angle range in which an amount of the relative movement between the cylinder and the plunger occurring during rotation of the cam changes with a constant gradient with respect to a change in a phase of the cam.

Since the valve closure start timing of the spill valve that provides the maximum amount of fuel that needs to be delivered is located within the predetermined cam angle range in which the amount of the relative movement between the cylinder and the plunger occurring during rotation of the cam changes with a constant gradient with respect to a change in the phase of the cam, the cam speed at the start of closure of the spill valve changes at a substantially constant rate even when the valve closure start timing of the spill valve is changed (i.e., delayed) in order to adjust the amount of fuel delivered from the fuel pump. The cam speed at the start of closure of the spill valve affects the amount of fuel delivered from the fuel pump. However, if the cam speed at the start of closure of the spill valve changes with a constant rate as mentioned above, it is possible to properly adjust the fuel delivery amount by changing the closure start timing of the spill valve, so that the controllability of the fuel delivery amount can be improved.

In the above-described aspect, the controller may end a closure of the spill valve when a position of the cam is near a top dead center, and the valve closure start timing of the spill valve that provides the maximum amount of fuel that needs to be delivered may be set so that the valve closure start timing exists near a most advanced point within the predetermined cam angle range.

Therefore, the changing of the closure start timing of the spill valve for the purpose of adjusting the fuel delivery amount can be performed in a broad range from the vicinity of the most advanced point to a point at which the cam reaches the top dead center, all within the predetermined cam angle range (i.e., the range in which the change in cam speed with respect to changes in the phase of the cam is constant).

In one embodiment, a cam profile may be set such that the valve closure start timing of the spill valve that provides the maximum amount of fuel that needs to be delivered exists within the predetermined cam angle range. Therefore, since the cam profile of the cam of the fuel pump is set such that the valve closure start timing of the spill valve that provides the maximum amount of fuel that needs to be delivered exists within the predetermined cam angle range, the cam speed at the start of closure of the spill valve changes with a constant amount of change with respect to a change of the closure start timing of the spill valve that is made in order to adjust the amount of fuel delivered from the fuel pump. Hence, it becomes possible to properly adjust the fuel delivery amount by changing the closure start timing of the spill valve, so that the controllability of the fuel delivery amount can be improved.

In another embodiment, a number of times that fuel is delivered during a predetermined amount of rotation of the cam may be set such that the valve closure start timing of the spill valve that provides the maximum amount of fuel that needs to be delivered exists within the predetermined cam angle range. Therefore, since the number of times of delivering fuel during the predetermined angle of rotation of the cam is set such that the valve closure start timing of the spill valve that provides the maximum amount of fuel that needs to be delivered exists within the predetermined cam angle range, the cam speed at the start of closure of the spill valve changes with a constant amount of change with respect to a change of the closure start timing of the spill valve that is made in order to adjust the amount of fuel delivered from the fuel pump. Hence, it becomes possible to properly adjust the fuel delivery amount by changing the closure start timing of the spill valve, so that the controllability of the fuel delivery amount can be improved.

In another embodiment, an inside diameter of the pressurizing chamber may be set such that the valve closure start timing of the spill valve that provides the maximum amount of fuel that needs to be delivered exists within the predetermined cam angle range. Therefore, since the inside diameter of the pressurizing chamber is set such that the valve closure start timing of the spill valve that provides the maximum amount of fuel that needs to be delivered exists within the predetermined cam angle range, the cam speed at the start of closure of the spill valve changes with a constant amount of change with respect to a change of the closure start timing of the spill valve that is made in order to adjust the amount of fuel delivered from the fuel pump. Hence, it becomes possible to properly adjust the fuel delivery amount by changing the closure start timing of the spill valve, so that the controllability of the fuel delivery amount can be improved.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein:

FIG. 7 is a schematic diagram illustrating a fuel supplying apparatus for an engine according to a second embodiment of the invention;

FIGS. 8A and 8B are time charts indicating the transitions of the fuel pressure P in the delivery pipe while the fuel delivery from the high-pressure fuel pump and fuel injection from fuel injection valves are performed in the second embodiment.

DETAILED DESCRIPTION OF PREFERRED EMBODIMENTS

A first embodiment in which the invention is applied to an automotive four-cylinder direct-injection gasoline engine will be described with reference to FIGS. 1 to 6.

Figure 1:
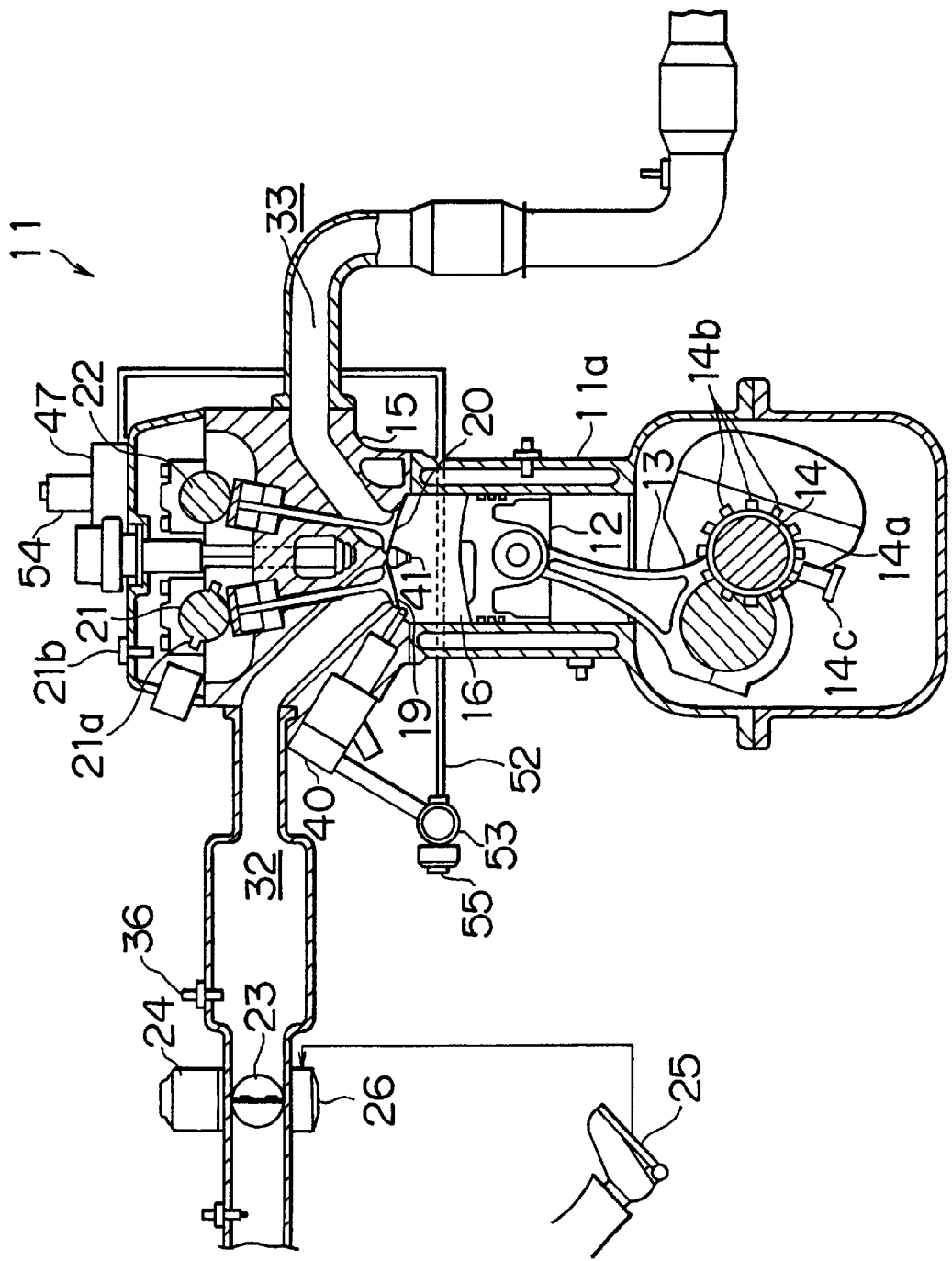
FIG. 1 is a sectional view of an engine to which a first embodiment of the fuel supplying apparatus of the invention is applied.

As shown in FIG. 1, an engine 11 has four pistons 12 in total (only one of them is shown in FIG. 1) that are reciprocatably provided in cylinders formed in a cylinder block 11a. The pistons 12 are connected to a crankshaft 14 that is an output shaft of the engine 11, via connecting rods 13. Reciprocating movements of the pistons 12 are converted by the connecting rods 13 into rotations of the crankshaft 14.

A signal rotor 14a is provided on the crankshaft 14. An outer peripheral portion of the signal rotor 14a has a plurality of protrusions 14b that are arranged equiangularly about an axis of the crankshaft 14. A crank position sensor 14c is provided at a side of the signal rotor 14a. As the protrusions 14b of the signal rotor 14a sequentially pass by the crank position sensor 14c during rotation of the crankshaft 14, the crank position sensor 14c outputs a pulse-like detection signal corresponding to the passage of each protrusion 14b.

A cylinder head 15 is provided on an upper end of the cylinder block 11a. A combustion chamber 16 is defined between the cylinder head 15 and each piston 12. An intake passage 32 and an exhaust passage 33 are connected to the combustion chambers 16. The communication between the combustion chambers 16 and the intake passage 32 is opened and closed by corresponding intake valves 19. The communication between the combustion chambers 16 and the exhaust passage 33 is opened and closed by corresponding exhaust valves 20.

An intake camshaft 21 and an exhaust camshaft 22 for opening and closing the intake valves 19 and the exhaust valves 20 are rotatably supported to the cylinder head 15. The intake camshaft 21 and the exhaust camshaft 22 are connected to the crankshaft 14 via a timing belt (not shown), gears (not shown) and the like so that rotation of the crankshaft 14 is transmitted to the camshafts 21, 22 by the timing belt, the gears and the like. As the intake camshaft 21 rotates, the intake valves 19 are opened and closed. As the exhaust camshaft 22 rotates, the exhaust valves 20 are opened and closed.

A cam position sensor 21b is provided at a side of the intake camshaft 21. The cam position sensor 21b detects protrusions 21a that are provided on an outer peripheral surface of the intake camshaft 21, and outputs detection signals. As the intake camshaft 21 rotates, the protrusions 21a of the camshaft 21 sequentially pass by the cam position sensor 21b. Thus, corresponding to the passage of each protrusion 21a, the cam position sensor 21b outputs a detection signal at a predetermined interval.

A throttle valve 23 for adjusting the amount of air taken into the engine 11 is provided upstream in the intake passage 32. The degree of opening of the throttle valve 23 is adjusted by controlling the operation of a throttle motor 24 based on an amount of depression of an accelerator pedal 25 (accelerator operation amount) detected by an accelerator position sensor 26. Through adjustment of the degree of opening of the throttle valve 23, the amount of intake air of the engine 11 is adjusted. A vacuum sensor 36 for detecting the pressure in the intake passage 32 is provided in a portion of the intake passage 32 extending downstream of the throttle valve 23. The vacuum sensor 36 outputs a detection signal corresponding to the pressure in the intake passage 32 detected by the sensor.

The cylinder head 15 is provided with fuel injection valves 40 that inject fuel into the corresponding combustion chambers 16, and ignition plugs 41 that ignite air-fuel mixture charged into the corresponding combustion chambers 16. When fuel is injected from a fuel injection valve 40 into the corresponding combustion chamber 16, injected fuel mixes with air taken in via the intake passage 32 to form a mixture of fuel and air in the combustion chamber 16. The mixture in the combustion chamber 16 burns upon ignition by the ignition plug 41. After combustion, exhaust gas is discharged into the exhaust passage 33.

In the engine 11, the combustion mode is changed between a stratified charge combustion mode and a uniform combustion mode in accordance with the state of operation of the engine 11. When the operation of the engine 11 is in a high-speed and high-load region in which high output is required, the uniform combustion mode is entered. In the uniform combustion mode, fuel is injected into each combustion chamber 16 during the intake stroke to form a uniformly mixed air-fuel mixture, and the combustion of the uniform mixture produces a high power. When the operation of the engine 11 is in a low-load and low-speed region in which high output is not required, the stratified charge combustion mode is entered. In the stratified charge combustion mode, fuel is injected into each combustion chamber 16 during the compression stroke to provide a fuel-rich mixture around the ignition plug 41, so that good ignition can be achieved even though the average air-fuel ratio of the entire amount of mixture in each combustion chamber 16 is a ratio considerably shifted to the fuel-lean side from the theoretical air-fuel ratio.

In order to achieve an air-fuel ratio of mixture that is on the fuel-lean side of the theoretical air-fuel ratio during the stratified charge combustion mode, the degree of opening of the throttle valve 23 is set to a greater value (toward the open end) than during the uniform combustion mode. Therefore, the pumping loss of the engine 11 decreases, and the fuel economy improves during the stratified charge combustion mode. Thus, by changing the combustion mode in accordance with the state of operation of the engine, it is possible to produce a necessary engine output and improve the fuel economy.

In the direct injection type engine 11 described above, the pressure of fuel supplied to the fuel injection valves 40 is set relatively high in order to inject fuel into the combustion chambers 16 overcoming the high pressure in the combustion chambers 16. The construction of a fuel-supplying apparatus of the engine 11 for supplying high-pressure fuel to the fuel injection valves 40 will be described in detail with reference to FIG. 2.

Figure 2:
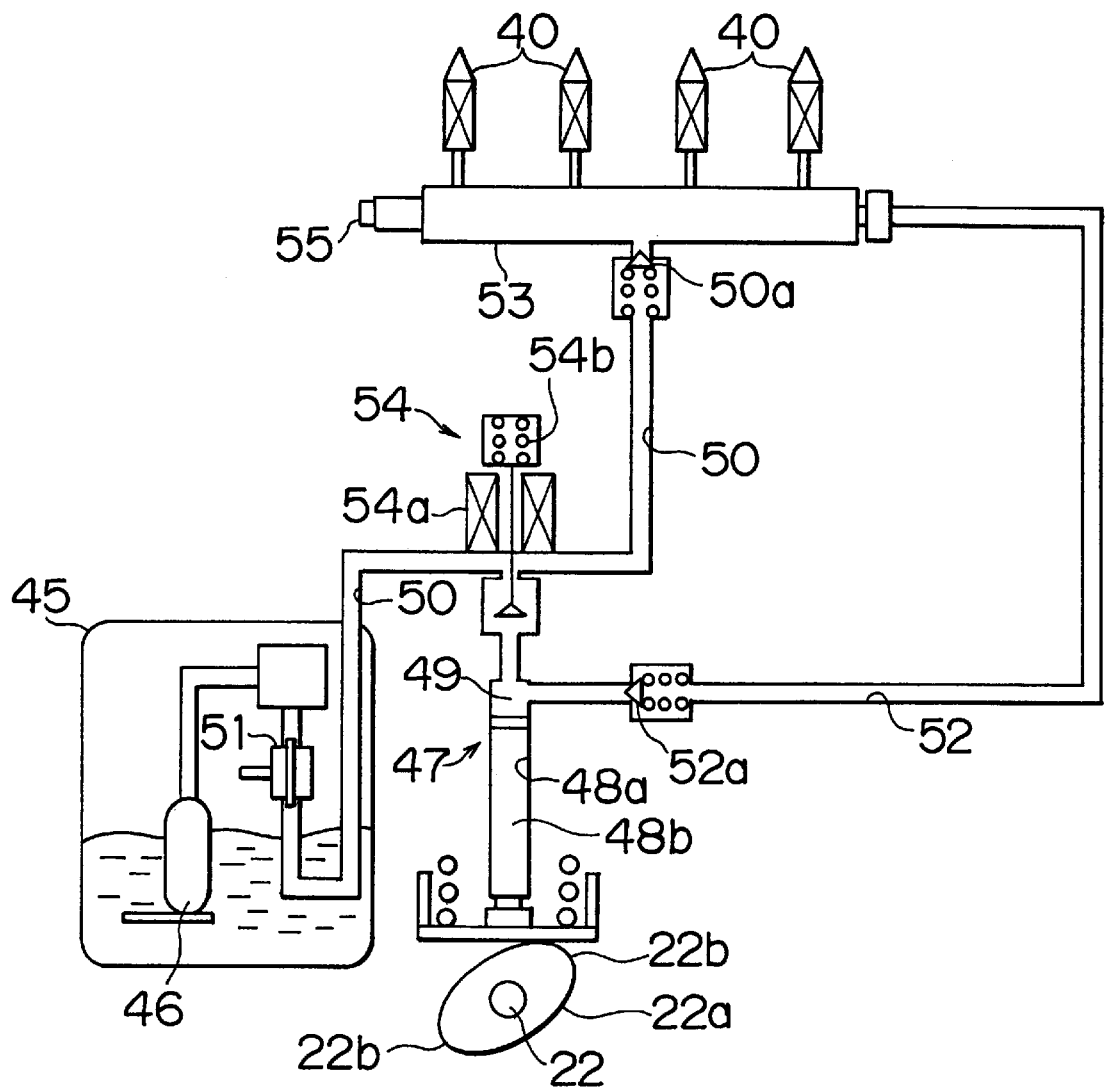
FIG. 2 is a schematic diagram illustrating a fuel supplying apparatus of the engine shown in FIG. 1.

As shown in FIG. 2, the fuel-supplying apparatus of the engine 11 has a feed pump 46 that pumps fuel from a fuel tank 45, and a high-pressure fuel pump 47 that pressurizes fuel fed by the feed pump 46 and delivers pressurized fuel toward the fuel injection valves 40. The pressure of fuel supplied by the feed pump 46 is set to, for example, 0.3 MPa, in this embodiment.

The high-pressure fuel pump 47 has a plunger 48b that is reciprocated within a cylinder 48a based on rotation of a cam 22a attached to the exhaust camshaft 22. The cam 22a has two cam lobes 22b that are arranged equiangularly about an axis of the exhaust camshaft 22. As the exhaust camshaft 22 rotates, the plunger 48b is reciprocated in the cylinder 48a in accordance with the cam lobes 22b.

The exhaust camshaft 22 completes one rotation (360°) during every two rotations (720°) of the crankshaft 14. The plunger 48b reciprocates twice during every one rotation of the exhaust camshaft 22. During every 720° rotation of the crankshaft 14, fuel injection from fuel injection valves 40 into the corresponding combustion chambers 16 of the engine 11 is performed four times. Therefore, in the engine 11, fuel injection is performed twice per reciprocation of the plunger 48b in the high-pressure fuel pump 47.

The high-pressure fuel pump 47 has a pressurizing chamber 49 that is defined by the cylinder 48a and the plunger 48b and that changes in capacity in accordance with the reciprocating movements of the plunger 48b. The pressurizing chamber 49 is connected to the feed pump 46 via a low-pressure fuel passage 50. The low-pressure fuel passage 50 has in its pathway a pressure regulator 51 for maintaining a constant pressure (0.3 MPa) in the low-pressure fuel passage 50. The pressurizing chamber 49 communicates with a delivery pipe 53 via a high-pressure fuel passage 52 and a check valve 52a. The fuel injection valves 40 corresponding to the individual cylinders of the engine 11 are connected to the delivery pipe 53.

The delivery pipe 53 is provided with a fuel pressure sensor 55 for detecting the pressure of fuel (fuel pressure) in the delivery pipe 53. The delivery pipe 53 communicates with the low-pressure fuel passage 50 via a check valve 50a. When the fuel pressure detected by the fuel pressure sensor 55 becomes excessively high, the check valve 50a opens to allow fuel to flow from the delivery pipe 53 to the low-pressure fuel passage 50. The pressure in the low-pressure fuel passage 50, into which fuel flows from the delivery pipe 53, is maintained at the constant pressure (0.3 MPa) by the pressure regulator 51. Therefore, the check valve 50a and the pressure regulator 51 prevent the pressure in the delivery pipe 53 from excessively rising.

The high-pressure fuel pump 47 is also provided with an electromagnetic spill valve 54 that opens and closes the communication between the low-pressure fuel passage 50 and the pressurizing chamber 49. The electromagnetic spill valve 54 has an electromagnetic solenoid 54a. The electromagnetic spill valve 54 is opened and closed by controlling the voltage applied to the electromagnetic solenoid 54a. That is, when electrification of the electromagnetic solenoid 54a is stopped, the electromagnetic spill valve 54 opens, due to a biasing force from a coil spring 54b, to establish a state in which the pressurizing chamber 49 is connected in communication to the low-pressure fuel passage 50.

When the plunger 48b is moved in such a direction as to expand the capacity of the pressurizing chamber 49 during the above-described state of the electromagnetic spill valve 54, that is, when the high-pressure fuel pump 47 undergoes the suction stroke, fuel pumped out from the feed pump 46 is drawn into the pressurizing chamber 49 via the low-pressure fuel passage 50. Then, while the plunger 48b is moved in the pressurizing chamber-capacity reducing direction, that is, during the ejection stroke of the high-pressure fuel pump 47, the electromagnetic solenoid 54a is electrified to close the electromagnetic spill valve 54, overcoming force from the coil spring 54b, so that the communication between the low-pressure fuel passage 50 and the pressurizing chamber 49 is closed. Upon the closure, fuel is delivered from the pressurizing chamber 49 toward the fuel injection valves 40.

In this manner, the high-pressure fuel pump 47 pressurizes fuel supplied from the feed pump 46, to a high pressure, for example, 12 MPa. Since fuel pressurized in this manner is delivered to the fuel injection valves 40 via the high-pressure fuel passage 52 and the delivery pipe 53, fuel can be injected directly into the combustion chambers 16, overcoming the high pressure in the combustion chambers 16.

In the high-pressure fuel pump 47, the amount of fuel delivered during one reciprocation of the plunger 48b is adjusted by adjusting the closed valve period of the electromagnetic spill valve 54 during the ejection stroke through control of the start timing of closure of the electromagnetic spill valve 54. That is, the amount of fuel delivered increases if the start timing of closure of the electromagnetic spill valve 54 is advanced to extend the duration of the closed valve period. The amount of fuel delivered decreases if the start timing of closure of the electromagnetic spill valve 54 is delayed to reduce the duration of the closed valve period.

By adjusting the amount of fuel delivered by the high-pressure fuel pump 47 as described above, the fuel pressure in the delivery pipe 53 is controlled to a target fuel pressure that is determined in accordance with the state of operation of the engine.

Figure 3A:
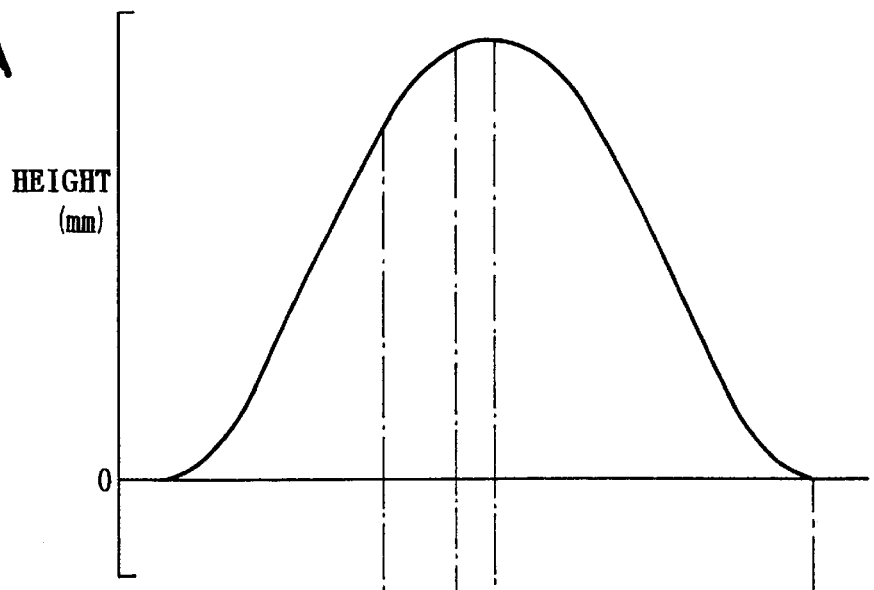
FIGS. 3A and 3B are graphs indicating the transitions of the height of a plunger and the cam speed with respect to changes in phase of a cam that drives a high-fuel pressure pump shown in FIG. 2.
Figure 3B:
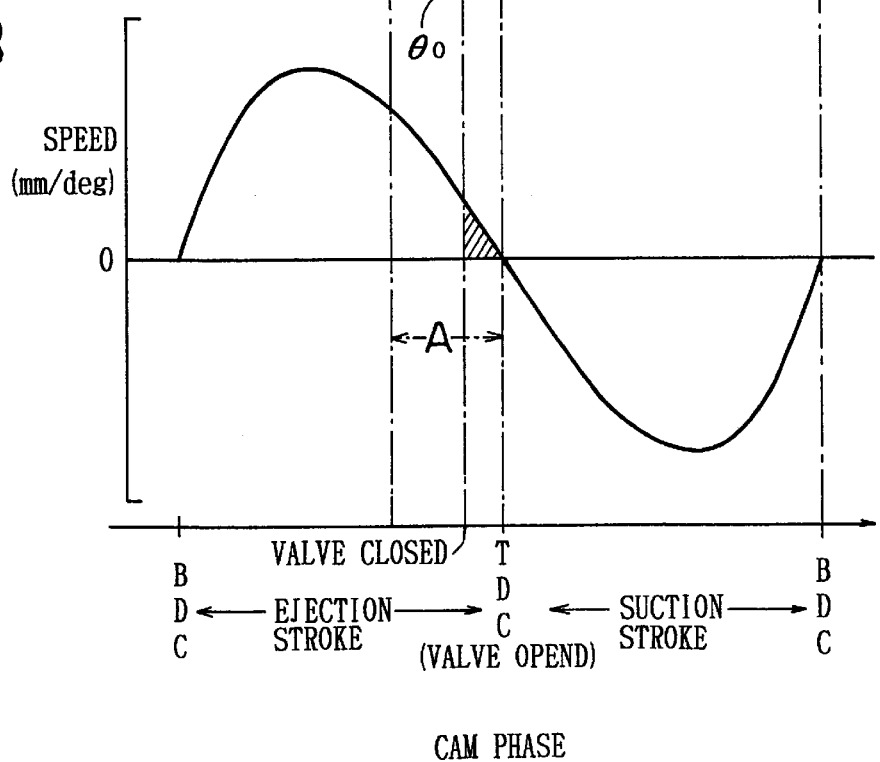

The configuration of the cam lobes 22b will be described with reference to FIGS. 3A and 3B. FIG. 3A is a graph indicating changes in the height of the plunger 48b with respect to changes in phase of the cam 22a. FIG. 3B is a graph indicating changes in the cam speed with respect to changes in phase of the cam 22a, that is, changes in the height of the plunger 48b corresponding to 1° rotation of the cam 22a.

The cam lobes 22b of the cam 22a are formed so that the height of the plunger 48b changes with respect to changes in phase of the cam 22a as indicated in FIG. 3A. With the cam 22a configured as described above, the height of the plunger 48b gradually decreases during the transition of the cam 22a from a top dead center (TDC) to a bottom dead center (BDC) (i.e, during the suction stroke). The height of the plunger 48b gradually increases during the transition of the cam 22a from the bottom dead center to the top dead center (i.e., during the ejection stroke).

The magnitude of the cam speed gradually increases with respect to the negative direction during a first half of the suction stroke, and gradually decreases with respect to the negative direction during the second half of the suction stroke. Furthermore, the magnitude of the cam speed gradually increases with respect to the positive direction during a first half of the ejection stroke, and gradually decreases with respect to the positive direction during the second half of the ejection stroke. Therefore, when the position of the cam 22a is near the top dead center during the ejection stroke, the magnitude of the cam speed decreases with respect to the positive direction as the position of the cam 22a approaches the top dead center.

To deliver fuel from the high-pressure fuel pump 47, the electromagnetic spill valve 54 is closed during the ejection stroke, and then is opened when the ejection stroke ends, that is, when the cam 22a reaches the top dead center. By operating the electromagnetic spill valve 54 in this manner, fuel is delivered from the high-pressure fuel pump 47 toward the fuel injection valves 40. The amount of fuel delivered from the high-pressure fuel pump 47 is adjusted through adjustment of the closed valve period of the electromagnetic spill valve 54 accomplished by changing the closure start timing of the electromagnetic spill valve 54.

The amount of fuel delivered from the high-pressure fuel pump 47 corresponds to the area of a hatched portion in FIG. 3B. The area of the hatched portion changes in accordance with the closed valve period of the electromagnetic spill valve 54. More specifically, if the closed valve period of the electromagnetic spill valve 54 is elongated by advancing the start timing of closure of the valve 54, the area of the hatched portion increases and the amount of fuel delivered from the high-pressure fuel pump 47 increases. If the closed valve period of the electromagnetic spill valve 54 is shortened by delaying the start timing of closure of the valve 54, the area of the hatched portion decreases and the amount of fuel delivered from the high-pressure fuel pump 47 decreases.

Figure 4:
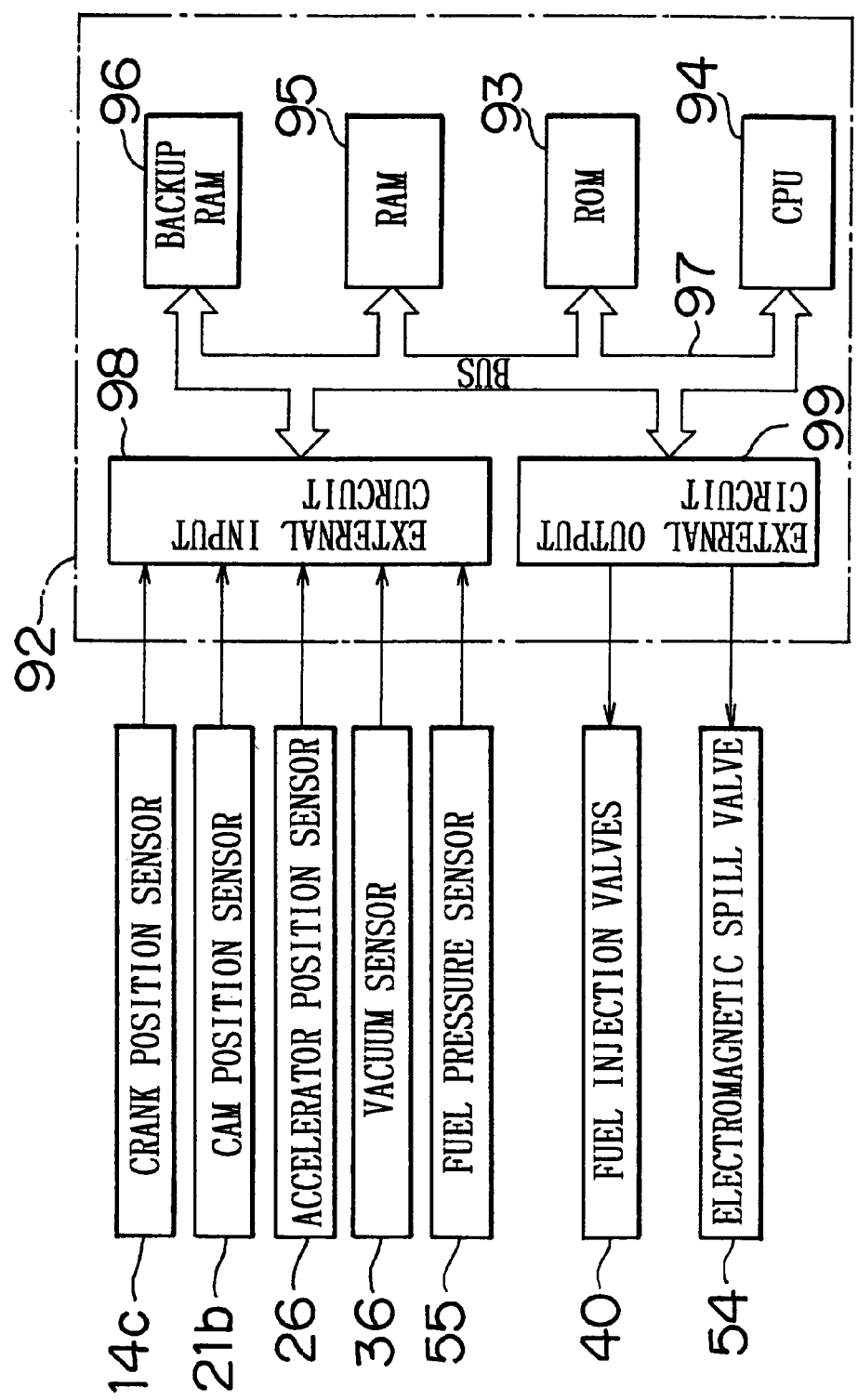
FIG. 4 is a block diagram illustrating an electrical construction of the fuel supplying apparatus.

An electrical construction of the above-described fuel supplying apparatus will be described with reference to FIG. 4.

The fuel supplying apparatus has an electronic control unit (hereinafter, referred to as "ECU") 92 for performing controls of the operation state of the engine 11, for example, the fuel injection control, the fuel pressure control, and the like. The ECU 92 is formed as an arithmetic logic circuit having a ROM 93, a CPU 94, a RAM 95, a backup RAM 96, and the like.

The ROM 93 is a memory storing various control programs, maps that are referred to during execution of the various control programs, and the like. The CPU 94 executes various operations based on the control programs and the maps stored in the ROM 93. The RAM 95 is a memory for temporarily storing results of operations of the CPU 94, data inputted from various sensors, and the like. The backup RAM 96 is a non-volatile memory for storing data and the like that needs to be retained while the engine 11 is stopped. The ROM 93, the CPU 94, the RAM 95 and the backup RAM 96 are connected to one another and to an external input circuit 98 and an external output circuit 99, via a bus 97.

The external input circuit 98 is connected to the crank position sensor 14c, the cam position sensor 21b, the accelerator pedal position sensor 26, the vacuum sensor 36, the fuel pressure sensor 55, and the like. The external output circuit 99 is connected to the fuel injection valves 40, the electromagnetic spill valve 54, and the like.

The ECU 92, constructed as described above, determines an engine revolution speed NE based on detection signals from the crank position sensor 14c. Furthermore, the ECU 92 determines an accelerator operation amount ACCP based on the detection signal from the accelerator pedal position sensor 26, and determines an intake pressure PM based on the detection signal from the vacuum sensor 36. During the stratified charge combustion mode, the ECU 92 calculates a basic fuel injection amount Qbse based on the engine revolution speed NE and the accelerator operation amount ACCP. During the uniform combustion mode, the ECU 92 calculates a basic fuel injection amount Qbse based on the engine revolution speed NE and the intake pressure PM.

During the stratified charge combustion mode, the ECU 92 drives and controls the fuel injection valves 40 so that an amount of fuel corresponding to a final fuel injection amount Qfin determined from the basic fuel injection amount Qbse is injected during the compression stroke of each cylinder of the engine 11. During the uniform combustion mode, the ECU 92 drives and controls the fuel injection valves 40 so that an amount of fuel corresponding to a final fuel injection amount Qfin determined from the basic fuel injection amount Qbse is injected during the intake stroke of each cylinder of the engine 11.

The amount of fuel injected from each fuel injection valve 40 is determined by the fuel pressure P in the delivery pipe 53 and the fuel injection duration. Therefore, it is preferable that the fuel pressure P determined based on the detection signal from the fuel pressure sensor 55 be kept at a target fuel pressure P0 determined in accordance with the state of operation of the engine 11. However, the fuel pressure P in the delivery pipe 53 drops every time fuel injection is performed. Therefore, it is necessary to deliver fuel from the high-pressure fuel pump 47 to the delivery pipe 53 at every predetermined crank angle (every predetermined cam angle of the cam 22a).

If the high-pressure fuel pump 47 is driven by using the cam 22a having two cam lobes 22b, the plunger 48b is reciprocated twice during every 720° rotation of the crankshaft 14, during which fuel injection from fuel injection valves 40 is performed four times. Therefore, if the electromagnetic spill valve 54 is controlled so as to deliver fuel during every reciprocation of the plunger 48b, fuel is injected from fuel injection valves 40 twice by using the amount of fuel delivered from the high-pressure fuel pump 47 by one performance of the fuel delivery. The transition of the fuel pressure P in the delivery pipe 53 based on the above-described fuel delivering operation will be described with reference to FIG. 6.

Figure 6:
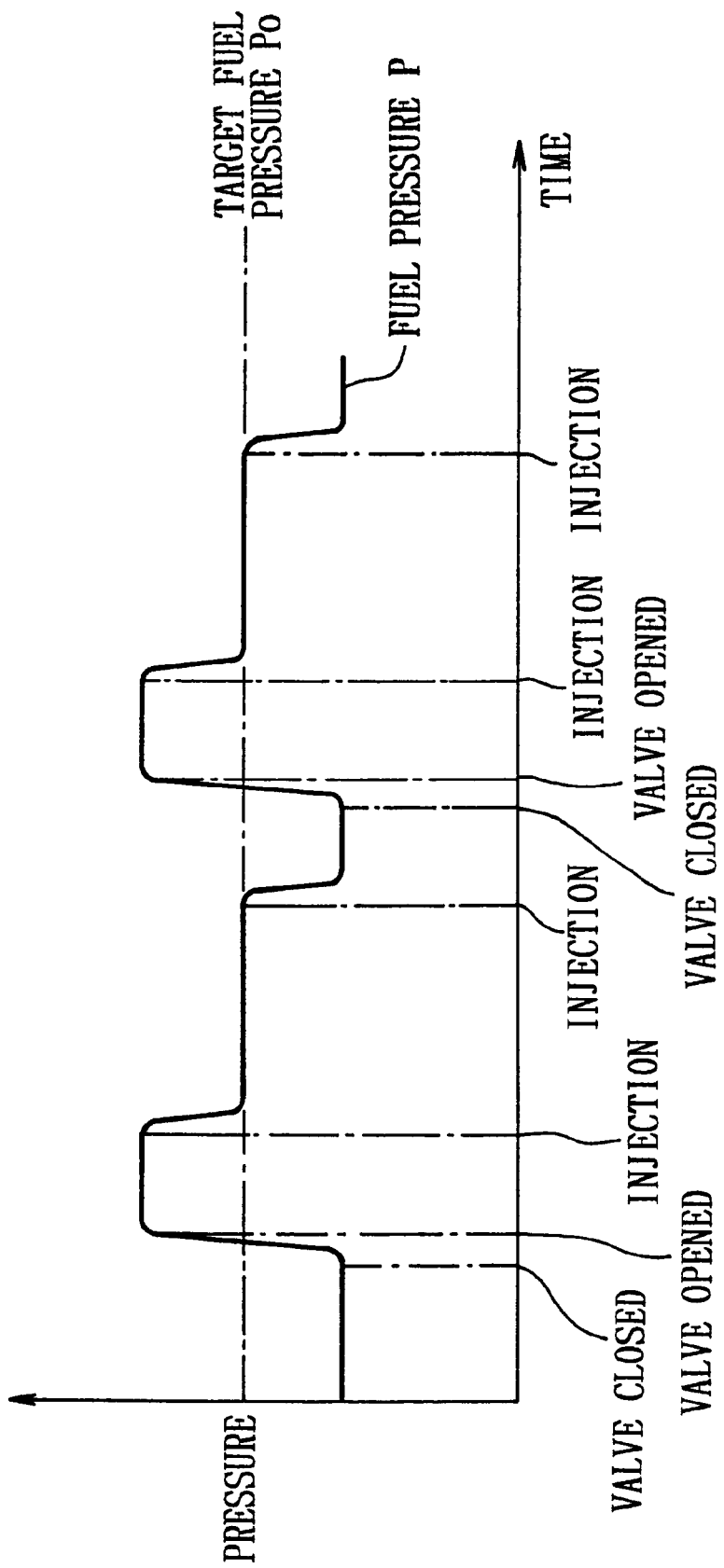
FIG. 6 is a time chart indicating the transition of the fuel pressure P in a delivery pipe while the fuel delivery from the high-pressure fuel pump and fuel injection from fuel injection valves are performed in the first embodiment.
Figure 9:
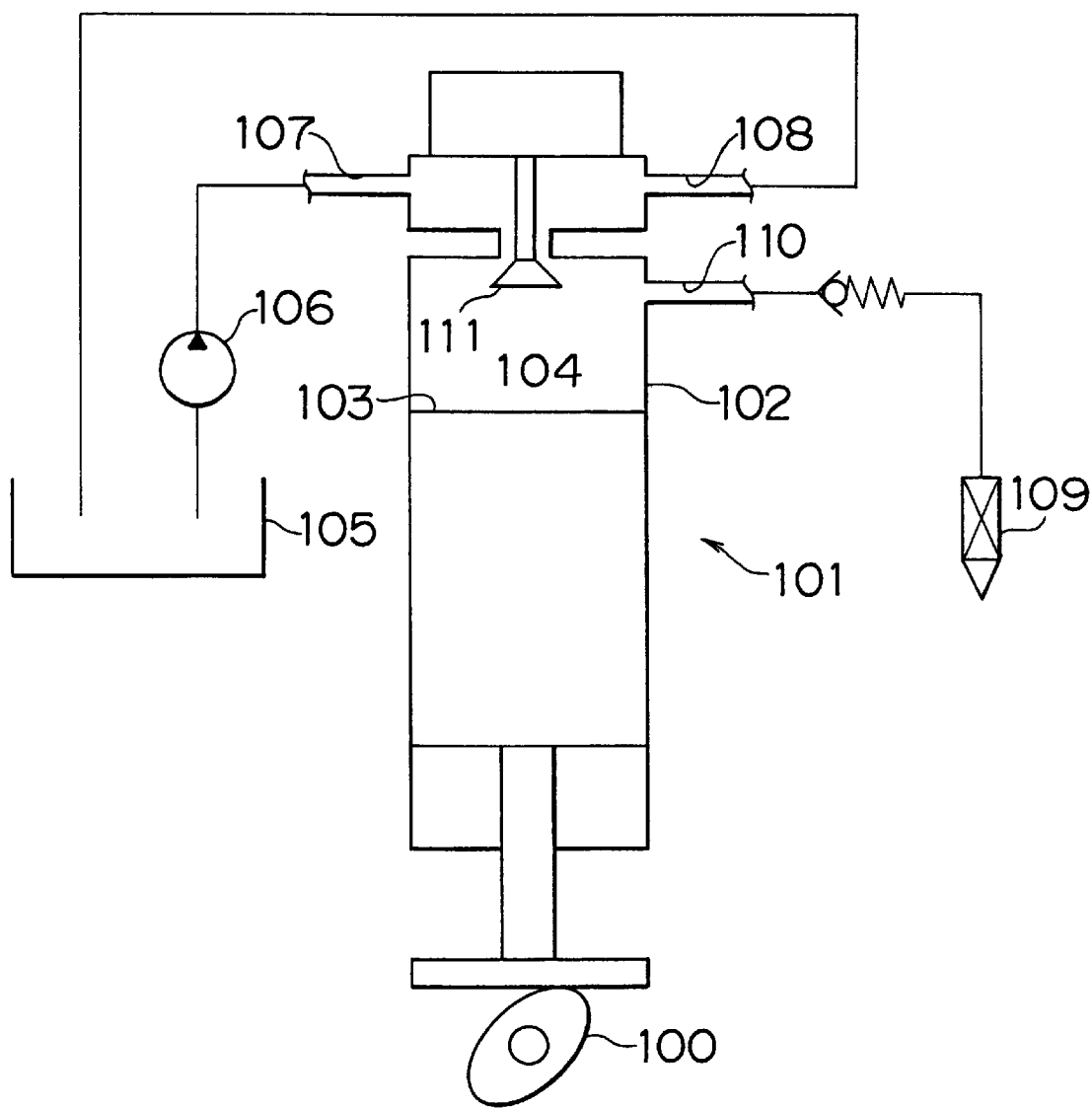
FIG. 9 is a schematic diagram illustrating a high-pressure fuel pump.

As indicated in FIG. 6, when closure of the electromagnetic spill valve 54 starts, fuel is delivered from the high-pressure fuel pump 47 so that the fuel pressure P in the delivery pipe 53 increases from a value below a target fuel pressure P0 toward a value above the target fuel pressure P0. Then, when the electromagnetic spill valve 54 is opened, the fuel pressure P stops rising and holds at a constant value. After remaining at the constant value, the fuel pressure P drops stepwise every time fuel injection is performed. After fuel injection has been performed twice, the fuel pressure P drops close to the pressure occurring before the aforementioned fuel delivery.

In this case, it is necessary to sufficiently increase the fuel pressure P by delivering an amount of fuel needed for performing fuel injection twice by one performance of the fuel delivery so that the fuel pressure P does not excessively drop after the two performances of fuel injection. Therefore, the start timing of closure of the electromagnetic spill valve 54 (the closed valve period) is adjusted so as to sufficiently increase the fuel pressure P.

A procedure of controlling the electromagnetic spill valve 54 will be described.

The ECU 92 calculates a duty ratio DT for controlling the start timing of closure of the electromagnetic spill valve 54, based on the fuel pressure P, the target fuel pressure P0, the final fuel injection amount Qfin, the engine revolution speed NE and the like. The duty ratio DT indicates the proportion of a cam angle $\theta$ in which the electromagnetic spill valve 54 remains closed to a predetermined cam angle of the cam 22a, for example, a cam angle $\theta 0$ corresponding to the ejection stroke of the high-pressure fuel pump 47, that is, $\theta/\theta 0$. The relationship between the cam angle $\theta$ and the cam angle $\theta 0$ is indicated in FIG. 3A.

As is apparent from FIG. 3A, the ECU 92 ends the closure of the electromagnetic spill valve 54 (opens the valve) when the position of the cam 22a reaches the top dead center. Therefore, as the duty ratio DT is increased, the start timing of closure of the electromagnetic spill valve 54 advances, and the amount of fuel delivered from the high-pressure fuel pump 47 to the delivery pipe 53 (indicated by the area of the hatched portion in FIG. 3B) increases.

The duty ratio DT is calculated as in equation (1).

$$DT=DTp+DTi+FF \quad (1)$$

where
DTp=proportional term
DTi=integral term
FF=feed forward term

In equation (1), the proportional term DTp is provided for bringing the fuel pressure P closer to the target fuel pressure P0, and the integral term DTi is provided for reducing the variation of the duty ratio DT caused by fuel leakage or the like. The proportional term DTp and the integral term DTi are calculated as in equations (2) and (3), respectively.

$$DTp=K1 \times (P0-P) \quad (2)$$

$$DTi=DTi+K2 \times (P0-P) \quad (3)$$

where K1, K2 are coefficients.

In equation (1), the feed forward term FF is provided for supplying an amount of fuel needed at the predetermined crank angle beforehand so that even during a transitional state of the engine 11 or the like, the fuel pressure P can be quickly brought close to the target fuel pressure P0. The feed forward term FF is determined based on the final fuel injection amount Qfin and the engine revolution speed NE with reference to a map. The value of the thus-determined feed forward term FF increases with increases in the final fuel injection amount Qfin, and also increases with increases in the engine revolution speed NE.

Based on the duty ratio DT calculated as in equation (1), the ECU 92 controls the timing of starting to electrify the electromagnetic solenoid 54a, that is, the start timing of closure of the electromagnetic spill valve 54. Relationships of the start timing of closure of the electromagnetic spill valve 54 with the final fuel injection amount Qfin and the engine revolution speed NE are indicated in FIG. 5.

Figure 5:
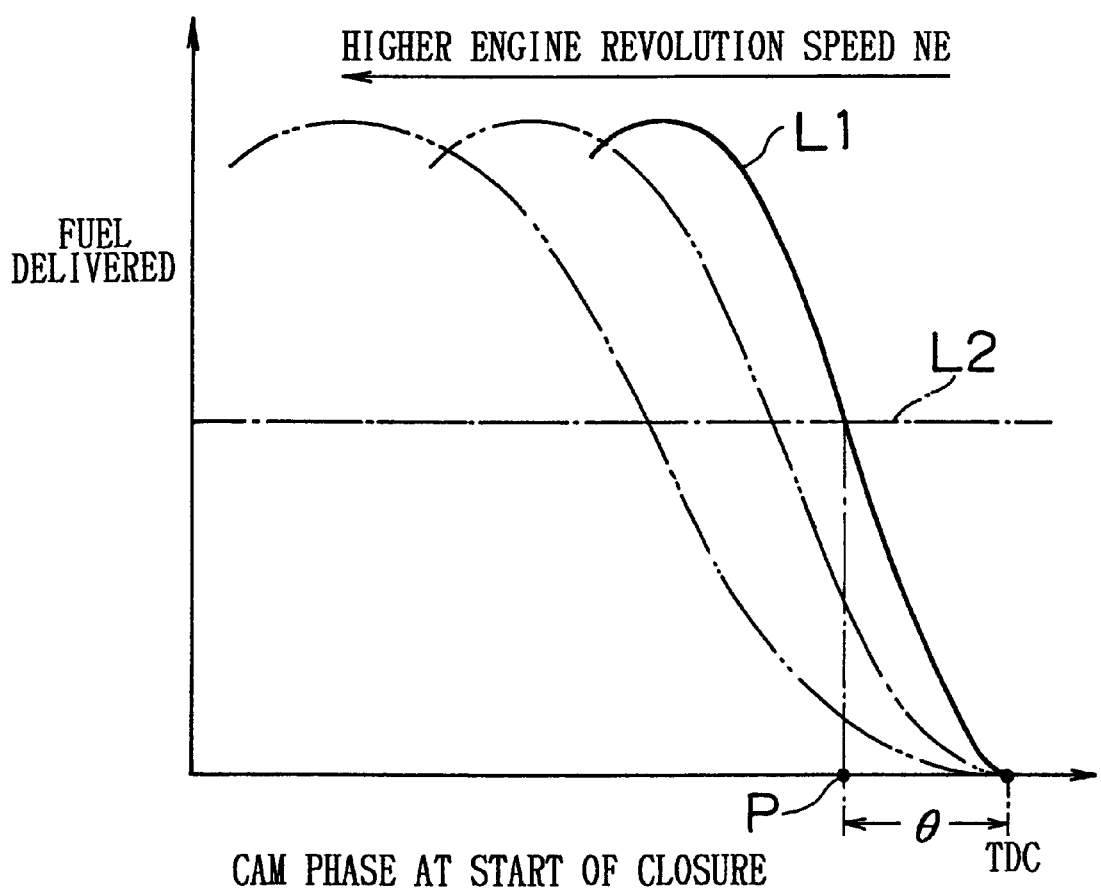
FIG. 5 is a graph indicating a relationship among the amount of fuel delivered (final fuel injection amount Qfin), the engine revolution speed NE and the start timing of closure of an electromagnetic spill valve.

In FIG. 5, a solid line L1 indicates changes in the amount of fuel delivered from the high-pressure fuel pump 47 (the amount of fuel delivered during one ejection stroke) in accordance with changes of the start timing of closure of the electromagnetic spill valve 54 under a condition that the engine revolution speed NE is constant. A one-dot chain line L2 in FIG. 5 indicates the amount of fuel that needs to be delivered by one performance of the fuel delivery in order to inject from a fuel injection valve 40 an amount of fuel corresponding to the final fuel injection amount Qfin.

The solid line L1 shifts leftward in FIG. 5 as indicated by two-dot chain lines, as the engine revolution speed NE increases. The one-dot chain line L2 shifts upward in FIG. 5 as the final fuel injection amount Qfin increases. The start timing of closure the electromagnetic spill valve 54, controlled based on the duty ratio DT, becomes a timing indicated by the intersection between the solid line L1 and the one-dot chain line L2 (a timing indicated by point p in FIG. 5). Therefore, the closure start timing of the electromagnetic spill valve 54 is advanced with increases in the final fuel injection amount Qfin and with increases in the engine revolution speed NE.

The amount of fuel delivered by the high-pressure fuel pump 47, which is adjusted by changing the start timing of closure of the electromagnetic spill valve 54, is greatly affected by the cam speed of the high-pressure fuel pump 47 occurring when closure of the electromagnetic spill valve 54 starts.

As indicated in FIG. 3B, the change in the cam speed with respect to changes in phase of the cam 22a becomes substantially constant, that is, the cam speed decreases with a constant gradient with respect to changes in phase of the cam 22a, within a predetermined cam angle range A preceding a point at which the cam 22a reaches the top dead center (TDC) during the ejection stroke of the high-pressure fuel pump 47. Therefore, if the changing of the start timing of closure of the electromagnetic spill valve 54 for the purpose of adjusting the amount of fuel delivered is performed in such a manner that the start timing of closure of the valve 54 does not deviate from the predetermined cam angle range A, it becomes possible to easily perform precise adjustment of the amount of fuel delivered.

That is, if the change in the speed of the cam 22a with respect to changes in phase of the cam 22a is substantially constant, the amount of change in the fuel delivery amount caused when the start timing of closure of the electromagnetic spill valve 54 is changed becomes unlikely to fluctuate in accordance with the cam phase. Therefore, by changing the start timing of closure of the electromagnetic spill valve 54 so that the start timing of closure of the electromagnetic spill valve 54 does not deviate from the predetermined cam angle range A, in which the gradient of the cam speed is substantially constant with respect to changes in phase of the cam 22, it becomes possible to easily perform precise adjustment of the fuel delivery amount during the operation of bringing the fuel pressure P to the target fuel pressure P0.

However, the start timing of closure of the electromagnetic spill valve 54 is changed in order to achieve an amount of fuel that needs to be delivered to perform fuel injection. Therefore, as the amount of fuel that needs to be delivered increases with increases in the fuel injection amount, the valve closure start timing is advanced, so that the valve closure start timing tends to deviate from the predetermined cam angle range A to the advanced side.

That is, when the final fuel injection amount Qfin is small, for example, during a low-load operation of the engine, the amount of fuel that needs to be delivered for fuel injection is small, so that in FIG. 5, the one-dot chain line L2 corresponding to the amount of fuel that needs to be delivered shifts downward in the graph. Therefore, the amount of fuel that needs to be delivered can be provided even though the start timing of closure of the electromagnetic spill valve 54 is set within the predetermined cam angle range A preceding the point at which the cam 22a reaches the top dead center.

Conversely, when the final fuel injection amount Qfin is great, for example, during a high-load operation of the engine, the amount of fuel that needs to be delivered is great, so that in FIG. 5, the one-dot chain line corresponding to the amount of fuel that needs to be delivered shifts upward in the graph. Therefore, the start timing of closure of the electromagnetic spill valve 54 must be advanced in order to provide the needed amount of fuel delivered, so that there is the danger of the valve closure start timing deviating from the predetermined cam angle range A to the advanced side.

If the start timing of closure of the electromagnetic spill valve 54 deviates from the predetermined cam angle range A, the change in the cam speed with respect to changes in phase of the cam 22 is not constant. Therefore, the amount of change in the fuel delivery amount caused by a change of the start timing of closure of the electromagnetic spill valve 54 becomes likely to vary in accordance with the phase of the cam 22a, so that it becomes difficult to perform precise adjustment of the fuel delivery amount during the operation of bringing the fuel pressure P to the target fuel pressure P0. If the adjustment of the amount of fuel delivered is not precisely performed, there occurs a drawback of the fuel pressure P greatly changing during the operation of bringing the fuel pressure P to the target fuel pressure P0.

Therefore, in the embodiment, the cam 22a is formed so that the start timing of closure of the electromagnetic spill valve 54 that provides a maximum value of the fuel delivery amount needed for fuel injection or the like is put within the predetermined cam angle range A. That is, the cam profile of the cam 22a is set so that the cam provides a greater amount of height of the plunger 48b corresponding to the top dead center of the cam 22a than an ordinary cam. By setting such a cam profile, the start timing of closure of the electromagnetic spill valve 54 that provides the maximum value of the needed fuel delivery amount is positioned near a most advanced point within the predetermined cam angle range A.

Therefore, the changing of the start timing of closure of the electromagnetic spill valve 54 for the purpose of adjusting the fuel delivery amount can be performed in the entire predetermined cam angle range A, that is, in a broad range from the vicinity of the most advanced point in the predetermined cam angle range A to the vicinity of the point at which the cam 22a reaches the top dead center. Thus, the adjustment of the fuel delivery amount to provide a needed fuel delivery amount can be performed merely by changing the start timing of closure of the electromagnetic spill valve 54 within the predetermined cam angle range A.

With regard to the changing of the start timing of closure of the electromagnetic spill valve 54 within the predetermined cam angle range A, the amount of change in the cam speed at the start of closure of the valve 54 caused by a change of the valve closure start timing becomes substantially constant regardless of the cam phase. Therefore, the amount of change in the fuel delivery amount caused by a change of the start timing of closure of the electromagnetic spill valve 54 is unlikely to vary in accordance with the cam phase. Hence, it becomes possible to easily perform precise adjustment of the fuel delivery amount by changing the start timing of closure of the electromagnetic spill valve 54, and it becomes possible to prevent considerable fluctuation of the fuel pressure P during the operation of bringing the fuel pressure P close to the target fuel pressure P0.

The above-described embodiment achieves advantages as follows.

The cam profile of the cam 22a of the high-pressure fuel pump 47 is set so that the start timing of closure of the electromagnetic spill valve 54 that provides the maximum value of the fuel delivery amount needed for fuel injection exists within the predetermined cam angle range A, in which the cam speed changes in the decreasing direction with a constant gradient with respect to changes in phase of the cam 22a. Due to this cam profile setting, the changing of the start timing of closure of the electromagnetic spill valve 54 for the purpose of adjusting the fuel delivery amount is performed within the predetermined cam angle range A. Due to this manner of changing the start timing of closure of the electromagnetic spill valve 54, it becomes possible to easily perform precise adjustment of the fuel delivery amount, and it becomes possible to prevent considerable fluctuation of the fuel pressure P during the operation of bringing the fuel pressure P close to the target fuel pressure P0.

The start timing of closure of the electromagnetic spill valve 54 that provides the maximum value of the fuel delivery amount needed for fuel injection exists near the most advanced point within the predetermined cam angle range A. Furthermore, the closure of the electromagnetic spill valve 54 ends when the position of the cam 22a is near the top dead center. Therefore, the changing of the start timing of closure of the electromagnetic spill valve 54 for the purpose of adjusting the fuel delivery amount can be performed within a broad range from the vicinity of the most advanced point in the predetermined cam angle range A to the vicinity of a point at which the cam 22a reaches the top dead center. Thus, an expanded adjustable range of the fuel delivery amount can be set.

A second embodiment of the invention will be described with reference to FIGS. 7, 8A and 8B. In this embodiment, the number of times of delivering fuel from a high-pressure fuel pump 47 during rotation of a predetermined cam angle (360°) of a cam 22a is set so that the closure start timing of an electromagnetic spill valve 54 that provides a maximum value of the needed fuel delivery amount exists within the predetermined cam angle range A, instead of setting the cam profile of the cam 22a of the high-pressure fuel pump 47 so that the aforementioned valve closure start timing exists within the predetermined cam angle range A. Thus, this embodiment differs from the first embodiment only in the technique for putting the start timing of closure of the electromagnetic spill valve 54 that provides a maximum value of the needed fuel delivery amount within the predetermined cam angle range A. Therefore, only the portions and features that distinguish this embodiment from the first embodiment will be described, and portions and feature of this embodiment substantially the same as those of the first embodiment will not be described in detail again.

In a fuel supplying apparatus of this embodiment shown in FIG. 7, a cam 22a for driving the high-pressure fuel pump 47 has four cam lobes 22b that are arranged equiangularly about an axis of an exhaust camshaft 22. In the high-pressure fuel pump 47 driven by this cam 22a, a plunger 48b reciprocates four times during every 720° rotation of a crankshaft 14 (i.e., during every 360° rotation of the exhaust camshaft 22), during which fuel injection is performed four times. Therefore, fuel injection is performed once per reciprocation of the plunger 48b.

The number of times of delivering fuel from the high-pressure fuel pump 47 during a 360° rotation of the cam 22a can be adjusted by controlling the electromagnetic spill valve 54. That is, the fuel delivery from the high-pressure fuel pump 47 can be stopped if the electromagnetic spill valve 54 is not allowed to close, that is, if the valve is kept in the open state, during the ejection stroke of the high-pressure fuel pump 47. During every 360° rotation of the cam 22a, the plunger 48b reciprocates four times, and the crankshaft 14 rotates 720° and, therefore, fuel injection from fuel injection valves 40 is performed four times. By suppressing the closure of the electromagnetic spill valve 54 during a certain number of ejection strokes during four reciprocations of the plunger 48b, the number of times of delivering fuel from the high-pressure fuel pump 47 during a 360° rotation of the cam 22a can be adjusted.

For example, if the electromagnetic spill valve 54 is closed during every other ejection stroke during every four reciprocations of the plunger 48b, the number of times of delivering fuel during every 360° rotation of the cam 22a becomes two and, therefore, fuel injection is performed twice per performance of the fuel delivery. If the electromagnetic spill valve 54 is closed during every ejection stroke during every four reciprocations of the plunger 48b, the number of times of delivering fuel during every 360° rotation of the cam 22a becomes four and, therefore, the fuel injection is performed once per performance of the fuel delivery. In this case, one performance of the fuel delivery needs to supply the delivery pipe 53 with only the amount of fuel needed for performing fuel injection once. Therefore, the amount of fuel delivered by one performance of the fuel delivery can be reduced to about a half, in comparison with the case where the fuel deliver is performed twice during every 360° rotation of the cam 22a.

The relationship between changes of the transition of the fuel pressure P and changes of the number of times of delivering fuel during a 360° rotation of the cam 22a will be described with reference to FIGS. 8A and 8B. FIG. 8A is a time chart indicating the transition of the fuel pressure P in the case where the number of times of delivering fuel during a 360° rotation of the cam 22a is set to two. FIG. 8B is a time chart indicating the transition of the fuel pressure P in the case where the number of times of delivering fuel during a 360° rotation of the cam 22a is set to four.

If the number of times of delivering fuel during a 360° rotation of the cam 22a is set to two, the fuel pressure P changes as indicated in FIGS. 8A and 8B. That is, when the closure of the electromagnetic spill valve 54 starts, the high-pressure fuel pump 47 delivers fuel so that the fuel pressure P changes from a value below a target fuel pressure P0 to a value above the target fuel pressure P0. Then, when the electromagnetic spill valve 54 is opened, the fuel pressure P stops rising and holds at a constant level. After remaining at the constant value, the fuel pressure P drops stepwise every time fuel injection is performed. After fuel injection has been performed twice, the fuel pressure P drops close to the pressure occurring before the aforementioned fuel delivery. In this case, it is necessary to sufficiently increase the fuel pressure P by delivering an amount of fuel needed for performing fuel injection twice by one performance of the fuel delivery so that the fuel pressure P does not excessively drop after the two performances of fuel injection. Therefore, the start timing of closure of the electromagnetic spill valve 54 (the closed valve period) is adjusted so as to sufficiently increase the fuel pressure P.

If the number of times of delivering fuel during a 360° rotation of the cam 22a is set to four, the fuel pressure P changes as indicated in FIG. 8B. That is, when the closure of the electromagnetic spill valve 54 starts, the high-pressure fuel pump 47 delivers fuel so that the fuel pressure P changes from a value below a target fuel pressure P0 to a value above the target fuel pressure P0. Then, when the electromagnetic spill valve 54 is opened, the fuel pressure P stops rising and holds at a constant level. After fuel injection is performed once, the fuel pressure P drops close to the pressure occurring before the aforementioned fuel delivery. After that, the fuel delivery is performed again, so that the fuel pressure P reaches the value above the target fuel pressure P0 again. In this case, one performance of the fuel delivery needs to deliver only an amount of fuel needed for performing fuel injection once. Therefore, it becomes unnecessary to increase the fuel pressure P to so high a level as the level achieved in the case where the number of times of delivering fuel during a 360° rotation of the cam 22a is set to two. Hence, the timing of starting the closure of the electromagnetic spill valve 54 in order to increase the fuel pressure P is delayed and the closed period of the valve 54 is shortened, in comparison with the case where the number of times of delivering fuel during a 360° rotation of the cam 22a is set to two.

Thus, when the number of times of delivering fuel during a 360° rotation of the cam 22a is changed, the amount of fuel that needs to be delivered by one performance of the fuel delivery changes even under a condition that the fuel injection amount remains unchanged, so that it becomes possible to adjust the start timing of closure of the electromagnetic spill valve 54. In this embodiment, the closure start timing of the electromagnetic spill valve 54 that provides a maximum value of the needed fuel delivery amount is put within the predetermined cam angle range A by setting the number of times of delivering fuel during every 360° rotation of the camshaft 22 to, for example, four. As a result, the adjustment of the fuel delivery amount to provide a needed amount of fuel delivered can be performed merely by changing the start timing of closure of the electromagnetic spill valve 54 within the predetermined cam angle range A.

With regard to the changing of the start timing of closure of the electromagnetic spill valve 54 within the predetermined cam angle range A, the amount of change in the cam speed at the start of closure of the valve 54 caused by a change of the timing becomes substantially constant regardless of the cam phase. Therefore, the amount of change in the fuel delivery amount caused by a change of the closure start timing of the electromagnetic spill valve 54 is unlikely to vary in accordance with the cam phase. Hence, it becomes possible to easily perform precise adjustment of the fuel delivery amount by changing the start timing of closure of the electromagnetic spill valve 54, and it becomes possible to prevent considerable fluctuation of the fuel pressure P during the operation of bringing the fuel pressure P close to the target fuel pressure P0.

The above-described embodiment achieves advantages as follows.

The number of times of delivering fuel from the high-pressure fuel pump 47 during a 360° rotation of the cam 22a is set to four, so that the start timing of closure of the electromagnetic spill valve 54 that provides the maximum value of the fuel delivery amount needed for fuel injection exists within the predetermined cam angle range A, in which the cam speed changes in the decreasing direction with a constant gradient with respect to changes in phase of the cam 22a. Due to this setting of the number of times of performing the fuel delivery, the changing of the closure start timing of the electromagnetic spill valve 54 for the purpose of adjusting the fuel delivery amount is performed within the predetermined cam angle range A. Due to this manner of changing the closure start timing of the electromagnetic spill valve 54, it becomes possible to easily perform precise adjustment of the fuel delivery amount, and it becomes possible to prevent considerable fluctuation of the fuel pressure P during the operation of bringing the fuel pressure P close to the target fuel pressure P0.

A third embodiment of the invention will be described. This embodiment differs from the first and second embodiments only in the technique for putting the start timing of closure of the electromagnetic spill valve 54 that provides a maximum value of the needed fuel delivery amount within the predetermined cam angle range A. Therefore, only the portions and features that distinguish this embodiment from the first and second embodiments will be described, and portions and feature of this embodiment substantially the same as those of the first and second embodiments will not be described in detail again.

In the high-pressure fuel pump 47, the amount of fuel delivered by one performance of the fuel delivery increases with increases in the inside diameter of the pressurizing chamber 49, provided that the range of movement (stroke) of the plunger 48b relative to the cylinder 48a and the closure start timing of the electromagnetic spill valve 54 remain unchanged. In this embodiment, the inside diameter of the pressurizing chamber 49 of the high-pressure fuel pump 47 is set so that the closure start timing of the electromagnetic spill valve 54 that provides a maximum value of the needed fuel delivery amount is put near a most advanced point within the predetermined cam angle range A. This setting of the inside diameter of the pressurizing chamber 49 is accomplished by adjusting the diameters of the cylinder 48a and the plunger 48b.

This embodiment achieves advantages as follows.

The inside diameter of the pressurizing chamber 49 of the high-pressure fuel pump 47 is set is set so that the closure start timing of the electromagnetic spill valve 54 that provides the maximum value of the fuel delivery amount needed for fuel injection exists within the predetermined cam angle range A, in which the cam speed changes in the decreasing direction with a constant gradient with respect to changes in phase of the cam 22a. Due to this setting of the inside diameter of the pressurizing chamber 49, the changing of the closure start timing of the electromagnetic spill valve 54 for the purpose of adjusting the fuel delivery amount is performed within the predetermined cam angle range A. Due to this manner of changing the closure start timing of the electromagnetic spill valve 54, it becomes possible to easily perform precise adjustment of the fuel delivery amount, and it becomes possible to prevent considerable fluctuation of the fuel pressure P during the operation of bringing the fuel pressure P close to the target fuel pressure P0.

The closure start timing of the electromagnetic spill valve 54 that provides the maximum value of the fuel delivery amount needed for fuel injection exists near the most advanced point within the predetermined cam angle range A. Furthermore, the closure of the electromagnetic spill valve 54 ends when the position of the cam 22a is near the top dead center. Therefore, the changing of the closure start timing of the electromagnetic spill valve 54 for the purpose of adjusting the fuel delivery amount can be performed within a broad range from the vicinity of the most advanced point in the predetermined cam angle range A to the vicinity a point at which the cam 22a reaches the top dead center. Thus, an expanded adjustable range of the fuel delivery amount can be set.

The foregoing embodiments may be modified, for example, in the following manners.

Although in conjunction with the foregoing embodiments, three kinds of techniques for putting the closure start timing of the electromagnetic spill valve 54 that provides the maximum value of the needed fuel delivery amount within the predetermined cam angle range A are described as examples, it is also possible to adopt a combination of two or more of those techniques, instead of adopting each technique independently. In such a case, the closure start timing of the electromagnetic spill valve 54 that provides the maximum value of the needed fuel delivery amount can be more precisely put within the predetermined cam angle range A, so that the adjustment of the fuel delivery amount can be more precisely performed and the controllability of the fuel delivery amount further improves.

Although in the second embodiment, the high-pressure fuel pump 47 is driven by using the cam 22a having four cam lobes 22b, the number of cam lobes 22b is not limited to four, but may also be changed to three or more than four. For example, if the number of cam lobes 22b is at least four, the number of times of delivering fuel during a predetermined period can be finely adjusted, and the range of adjustment of the number of times of delivering fuel during a 360° rotation of the cam 22a can be expanded. In this case, the number of times of delivering fuel during a 360° rotation of the cam 22a may also be suitably changed to a number other than four, on condition that the closure start timing of the electromagnetic spill valve 54 that provides the maximum value of the needed fuel delivery amount is put within the predetermined cam angle range A. Furthermore, in this case, it is preferable that the closure start timing of the electromagnetic spill valve 54 that provides the maximum value of the needed fuel delivery amount be put near a most advanced point within the predetermined cam angle range A, so that the closure start timing of the electromagnetic spill valve 54 can be changed in a broad range.

In the first embodiment, the cam profile of the cam 22a is set so that the height of the plunger 48b occurring when the position of the cam 22a is near the top dead center becomes greater than the amount of height achieved by an ordinary cam, in order to put the closure start timing of the electromagnetic spill valve 54 that provides the maximum value of the needed fuel delivery amount within the predetermined cam angle range A. Instead, the cam profile of the cam 22a may be set to such a cam profile that the predetermined cam angle range A becomes greater than an ordinary span thereof, in order to put the closure start timing of the electromagnetic spill valve 54 that provides the maximum value of the needed fuel delivery amount within the predetermined cam angle range A.

Although in the foregoing embodiments, the closure end timing (opening timing) of the electromagnetic spill valve 54 during the ejection stroke of the high-pressure fuel pump 47 is set to the timing at which the cam 22a reaches the top dead center, the end timing of closure of the electromagnetic spill valve 54 may be suitably changed.

Although in the foregoing embodiments, the closure start timing of the electromagnetic spill valve 54 during the ejection stroke of the high-pressure fuel pump 47 is positioned near a most advanced position within the predetermined cam angle range A, the positioning of the closure start timing of the valve may be suitably changed.

Although in the foregoing embodiments, the invention is applied to fuel supplying apparatus for gasoline engines, the invention may also be applied to fuel supplying apparatus for diesel engines.

While the invention has been described with reference to preferred embodiments thereof, it is to be understood that the invention is not limited to the disclosed embodiments or constructions. On the contrary, the invention is intended to cover various modifications and equivalent arrangements.

What is claimed is:

1. A fuel supplying apparatus for an internal combustion engine, having a fuel pump that draws fuel into a pressurizing chamber and delivers fuel toward a fuel injection valve of the internal combustion engine by changing a capacity of the pressurizing chamber based on a relative movement between a cylinder and a plunger caused by a rotation of a cam, and a spill valve that opens and closes a communication between the pressurizing chamber and a spill passage for letting fuel out of the pressurizing chamber, an amount of fuel delivered from the fuel pump toward the fuel injection valve being adjusted by controlling a closed valve period of the spill valve, the fuel supplying apparatus comprising:

a controller that controls the closed valve period of the spill valve by changing a valve closure start timing of the spill valve so that an amount of fuel that needs to be delivered from the fuel pump for a fuel injection from the fuel injection valve is provided;

the fuel supplying apparatus configured so that the valve closure start timing of the spill valve that provides a maximum amount of fuel that needs to be delivered occurs within a predetermined cam angle range in which an amount of the relative movement between the cylinder and the plunger occurring during rotation of the cam changes with a constant gradient with respect to a change in phase of the cam.

2. A fuel supplying apparatus according to claim 1, wherein the controller ends the closure valve period of the spill valve when a position of the cam is near a top dead center, and wherein the valve closure start timing of the spill valve that provides the maximum amount of fuel that needs to be delivered is set so that the valve closure start timing exists near a most advanced point within the predetermined cam angle range.

3. A fuel supplying apparatus according to claim 1, wherein the fuel supplying apparatus is configured by providing the cam with a cam profile that is set such that the valve closure start timing of the spill valve that provides the maximum amount of fuel that needs to be delivered exists within the predetermined cam angle range.

4. A fuel supplying apparatus according to claim 1, wherein the fuel supplying apparatus is configured by providing the cam with a number of lobes such that a number of times that fuel is delivered during a predetermined angle of rotation of the cam is set such that the valve closure start timing of the spill valve that provides the maximum amount of fuel that needs to be delivered exists within the predetermined cam angle range.

5. A fuel supplying apparatus according to claim 1, wherein the fuel supplying apparatus is configured by providing the pressurizing chamber with an inside diameter such that the valve closure start timing of the spill valve that provides the maximum amount of fuel that needs to be delivered exists within the predetermined cam angle range.

6. A method of making a fuel supplying apparatus for an internal combustion engine, the fuel supplying apparatus including a fuel pump that draws fuel into a pressurizing chamber and delivers the fuel toward a fuel injection valve of the internal combustion engine by changing a capacity of the pressurizing chamber based on a relative movement between a cylinder and a plunger caused by a rotation of a cam; and a spill valve that opens and closes a communication between the pressurizing chamber and a spill passage for letting the fuel out of the pressurizing chamber; an amount of the fuel delivered from the fuel pump toward the fuel injection valve being adjusted by controlling a closed valve period of the spill valve; the closed valve period of the spill valve being controlled by changing a valve closure start timing of the spill valve based upon an amount of fuel that needs to be delivered from the fuel pump for a fuel injection; the method comprising:

configuring the cam to have a predetermined cam angle range in which an amount of the relative movement between the cylinder and the plunger occurring during rotation of the cam changes with a constant gradient with respect to a change in phase of the cam; and configuring the fuel supplying apparatus so that the valve closure start timing of the spill valve that provides a maximum amount of fuel that needs to be delivered occurs within the predetermined cam angle range.

7. A method according to claim 6, wherein the closure valve period of the spill valve ends when a position of the cam is near a top dead center, and wherein the valve closure start timing of the spill valve that provides the maximum amount of fuel that needs to be delivered is set so that the valve closure start timing exists near a most advanced point within the predetermined cam angle range.

8. A method according to claim 6, wherein the step of configuring the fuel supplying apparatus includes providing the cam with a cam profile that is set such that the valve closure start timing of the spill valve that provides the maximum amount of fuel that needs to be delivered exists within the predetermined cam angle range.

9. A method according to claim 6, wherein the step of configuring the fuel supplying apparatus includes providing the cam with a number of lobes such that a number of times that fuel is delivered during a predetermined angle of rotation of the cam is set such that the valve closure start timing of the spill valve that provides the maximum amount of fuel that needs to be delivered exists within the predetermined cam angle range.

10. A method according to claim 6, wherein the step of configuring the fuel supplying apparatus includes providing the pressurizing chamber with an inside diameter such that the valve closure start timing of the spill valve that provides the maximum amount of fuel that needs to be delivered exists within the predetermined cam angle range.

11. A method of supplying fuel for an internal combustion engine utilizing a fuel supplying apparatus that includes a fuel pump that draws fuel into a pressurizing chamber and delivers the fuel toward a fuel injection valve of the internal combustion engine by changing a capacity of the pressurizing chamber based on a relative movement between a cylinder and a plunger caused by a rotation of a cam; and a spill valve that opens and closes a communication between the pressurizing chamber and a spill passage for letting the fuel out of the pressurizing chamber; an amount of the fuel delivered from the fuel pump toward the fuel injection valve being adjusted by controlling a closed valve period of the spill valve, the method comprising:

controlling the closed valve period of the spill valve by changing a valve closure start timing of the spill valve so that an amount of fuel that needs to be delivered from the fuel pump for a fuel injection from the fuel injection valve is provided;

wherein the fuel supplying apparatus is configured so that the valve closure start timing of the spill valve that provides a maximum amount of fuel that needs to be delivered occurs within a predetermined cam angle range in which an amount of the relative movement between the cylinder and the plunger occurring during rotation of the cam changes with a constant gradient with respect to a change in phase of the cam.

12. A method according to claim 11, wherein the controlling step ends the closure valve period of the spill valve when a position of the cam is near a top dead center, and wherein the valve closure start timing of the spill valve that provides the maximum amount of fuel that needs to be delivered is set so that the valve closure start timing exists near a most advanced point within the predetermined cam angle range.

13. A method according to claim 11, wherein the fuel supplying apparatus is configured by providing the cam with a cam profile that is set such that the valve closure start timing of the spill valve that provides the maximum amount of fuel that needs to be delivered exists within the predetermined cam angle range.

14. A method according to claim 11, wherein the fuel supplying apparatus is configured by providing the cam with a number of lobes such that a number of times that fuel is delivered during a predetermined angle of rotation of the cam is set such that the valve closure start timing of the spill valve that provides the maximum amount of fuel that needs to be delivered exists within the predetermined cam angle range.

15. A method according to claim 11, wherein the fuel supplying apparatus is configured by providing the pressurizing chamber with an inside diameter such that the valve closure start timing of the spill valve that provides the maximum amount of fuel that needs to be delivered exists within the predetermined cam angle range.

* * * * *